(12) United States Patent
Chuang

(10) Patent No.: US 7,232,250 B2
(45) Date of Patent: Jun. 19, 2007

(54) PRISM SHEET

(76) Inventor: Chih-Lun Chuang, No. 65, Yen Ping Rd., Chung Li City, Taoyuan Hsien (TW)

( * ) Notice: Subject to any disclaimer, the term of this patent is extended or adjusted under 35 U.S.C. 154(b) by 123 days.

(21) Appl. No.: 11/129,477

(22) Filed: May 16, 2005

(65) Prior Publication Data

US 2006/0256582 A1    Nov. 16, 2006

(51) Int. Cl.
*F21V 5/02* (2006.01)
(52) U.S. Cl. .................. 362/620; 362/619; 362/339
(58) Field of Classification Search ............. 362/603, 362/606, 607, 627, 620, 626, 339, 619; 359/625, 359/831, 837
See application file for complete search history.

(56) References Cited

U.S. PATENT DOCUMENTS

2004/0263061 A1* 12/2004 Ishikawa et al. ............ 313/501

FOREIGN PATENT DOCUMENTS

JP       7-159607    *  6/1995
KR    2001081523    *  8/2001

* cited by examiner

*Primary Examiner*—Thomas M. Sember
(74) *Attorney, Agent, or Firm*—Leong C. Lei

(57) ABSTRACT

A prism sheet for a LCD backlight module is provided. The prism sheet contains a base layer and a prism layer formed on a side of the base layer. The prism layer contains multiple parallel latitudinal and longitudinal prism lenses intersecting with each other. As such, the prism sheet could provide both latitudinal and longitudinal convergence for the scattered lights from the diffusion film. Additionally, by adjusting the apex angles, shapes, and heights of the prism lenses, optimal horizontal and vertical viewing angles of the LCD display could be achieved.

2 Claims, 7 Drawing Sheets

PRISM SHEET

BACKGROUND OF THE INVENTION (a) Technical Field of the Invention

The present invention generally relates to prism sheets, and more particularly to a prism sheet of a LCD's backlight module providing both latitudinal and longitudinal convergence and optimal horizontal and vertical viewing angles for the LCD display.

(b) Description of the Prior Art

A typical liquid crystal display (LCD) device usually installs a number of diffusion films and prism sheets between the LCD's panel and a light guide plate, so that lights emitted from the light guide plate is scattered by the diffusion film and then converged by the prism sheet toward the LCD panel, thereby, increasing the brightness of LCD panel in a range of viewing angles.

As illustrated in FIG. 1, a conventional prism sheet mainly contains a base layer 1 and a prism layer 2 formed on a side of the base layer 1. The prism layer 2 contains a plurality of parallel-arranged prism lenses 3 having a triangular cross section. Emitted lights from the light guide plate (not shown) is first scattered by the diffusion film (not shown) and then, due to the refraction effect provided by the prism lenses, converged toward a direction normal to the LCD panel (not shown).

In real-life applications, the convergence provided by the prism sheet could enhance the brightness of the LCD display. However, the viewing angle of the LCD display would also be limited by such convergence. Due to the structure of the conventional prism sheet, the range of viewing angles achieved usually could only satisfy either the vertical or the horizontal, but not both, viewing angles of the LCD display.

Accordingly, how to provide a prism sheet that could be mass-produced with the current industry expertise, preserve the benefit of enhancing LCD brightness, but achieve satisfactory viewing angles, both horizontal and vertical, required by the LCD display is the major motivation behind the present invention.

SUMMARY OF THE INVENTION

The primary purpose of the present invention is to provide a prism sheet which could provide both latitudinal and longitudinal convergence, and could achieve horizontal and vertical viewing angles required by the LCD displays.

The principle behind the present invention lies in that the viewing angles of a LCD display is mainly determined by the apex angles, shapes, and heights of the prism lenses on the prism sheet. Therefore, when the apex angles, shapes, and heights of the latitudinal and longitudinal prism lenses are identical, the horizontal and vertical viewing angles of the LCD display would also be identical. On the other hand, when the latitudinal and longitudinal prism lenses have different apex angles, shapes, and heights, the horizontal and vertical viewing angles of the LCD display would be different as well.

Based on the foregoing principle, a prism sheet of the present invention contains a base layer and a prism layer formed on a side of the base layer. The prism layer contains multiple parallel latitudinal and longitudinal prism lenses intersecting with each other. As such, the prism sheet of the present invention could provide both latitudinal and longitudinal convergence for the scattered lights from the diffusion film. Additionally, by adjusting the apex angles, shapes, and heights of the prism lenses, optimal horizontal and vertical viewing angles of the LCD display could be achieved.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In the following, detailed description along with the accompanied drawings is given to better explain preferred embodiments of the present invention.

Figure 1:
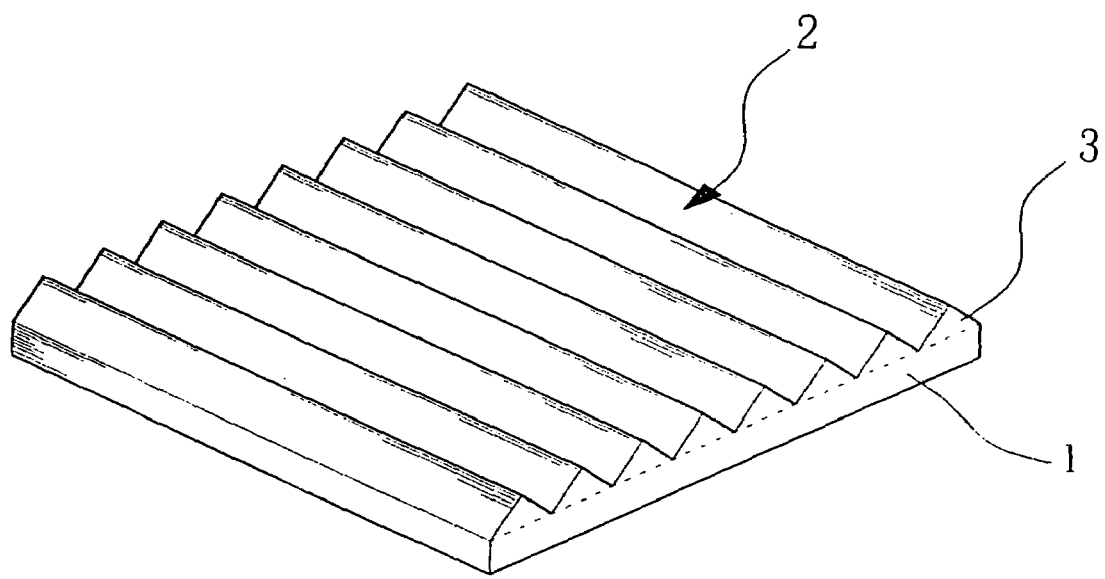
FIG. 1 is a perspective view showing a conventional prism sheet.
Figure 2:
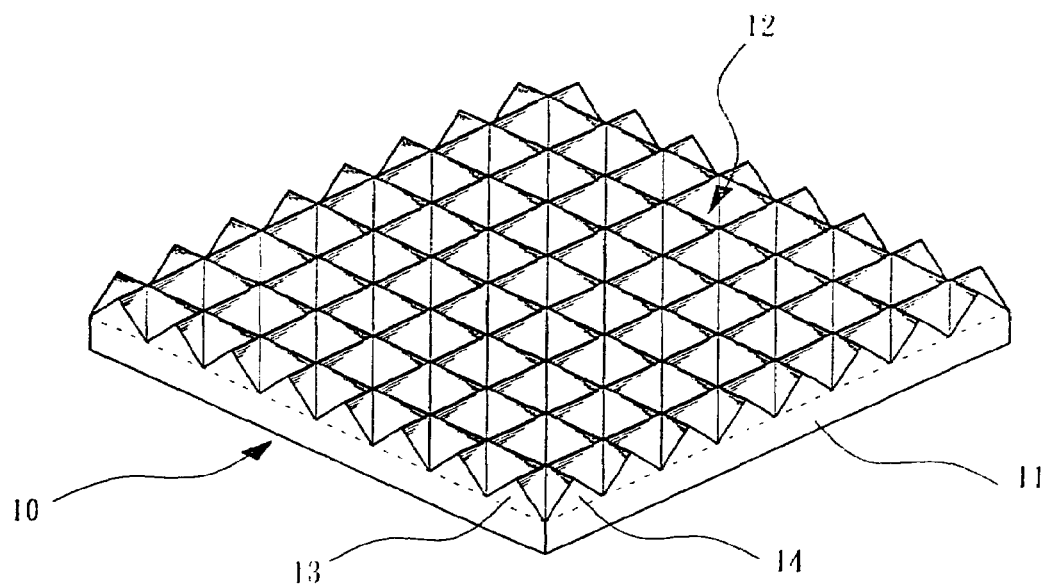
FIG. 2 is a perspective view showing a prism sheet according to a first embodiment of the present invention.
Figure 3:
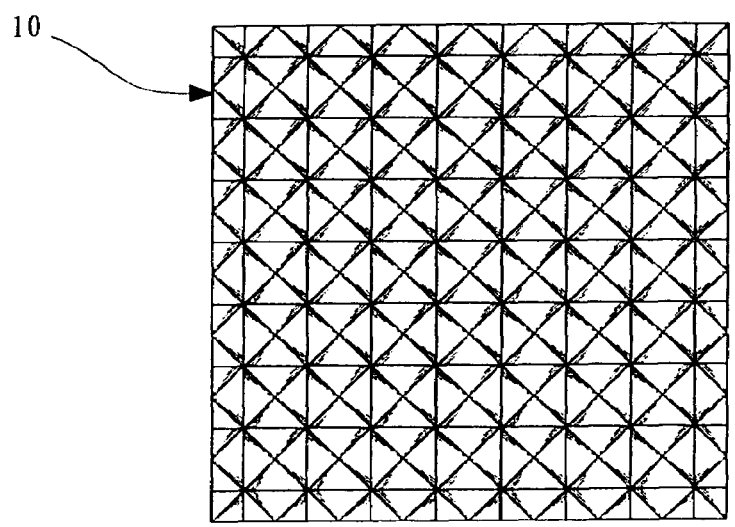
FIG. 3 is a top view of the prism sheet of FIG. 2.

As illustrated in FIGS. 2 and 3, a prism sheet 10 according to a first embodiment of the present invention is composed of a base layer 11 and a prism layer 12 on a side of the base layer 11. The prism layer 12 contains a plurality of parallel, latitudinal prism lenses 13 and another plurality of parallel, longitudinal prism lenses 14, both formed integrally with the base layer 11 and intersecting with each other.

Figure 4:
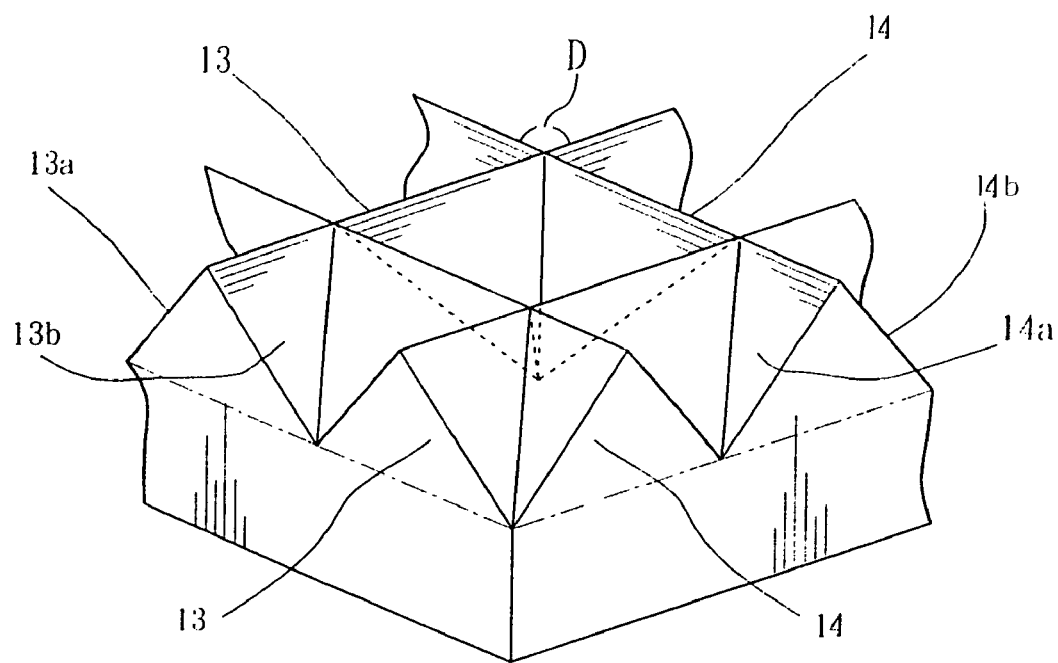
FIG. 4 is an enlarged viewing showing a portion of the prism sheet of FIG. 2.
Figure 5:
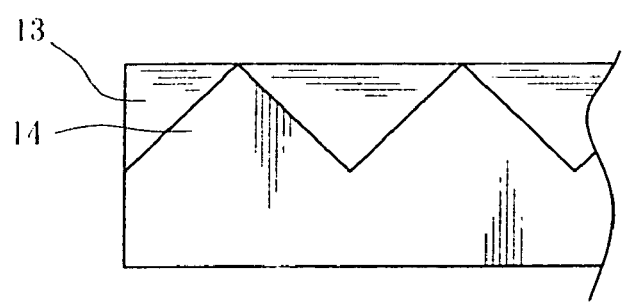
FIG. 5 is a side view showing the prism sheet of FIG. 2.

The included angle D (see FIG. 4) at where a latitudinal prism lens 13 intersects a longitudinal prism lens 14 is preferably a right angle or it could be an angle of an arbitrary degree. Please also refer to FIGS. 4 and 5. Each of the prism lenses 13 and 14 has a triangular cross section, and two slant surfaces 13a and 13b, and 14a and 14b, respectively. Within every grid section bounded by two adjacent prism lenses 13 and two adjacent prism lenses 14, a light converging unit is formed, which is a base cone having four triangular slant surfaces. As such, the prism sheet 10 of the present embodiment is able to converge the scattered lights from the diffusion film longitudinally and latitudinally. Hence, the prism sheet 10 of a backlight module for an LCD located between a light guide plate of the backlight module and a panel of the LCD, comprises: a base layer 11 adapted to be above the light guide plate; and a prism layer 12 formed on one side of the base layer 11, the prism layer 12 being composed of a plurality of parallel longitudinal rows of first lenses 14 and a plurality of parallel latitudinal rows of second lenses 13 which are intersected with each other at right angles, wherein each of the parallel longitudinal rows of the first lenses 14 has a triangular cross section and a first ridge at a top thereof and there is no gap between bottoms of every two adjacent rows of the first lenses 14. Each of said parallel longitudinal rows of the second lenses 13 has a triangular cross section and a first ridge at a top thereof and there is no gap between bottoms of every two adjacent rows of the second lenses 13, thereby making the first ridge intersect the second ridge at a right angle and forming a plurality of rectangular recesses which are open at a top and have four slant triangular surfaces 13a, 13b, 14a and 14b intersecting each other at a point.

Figure 6:
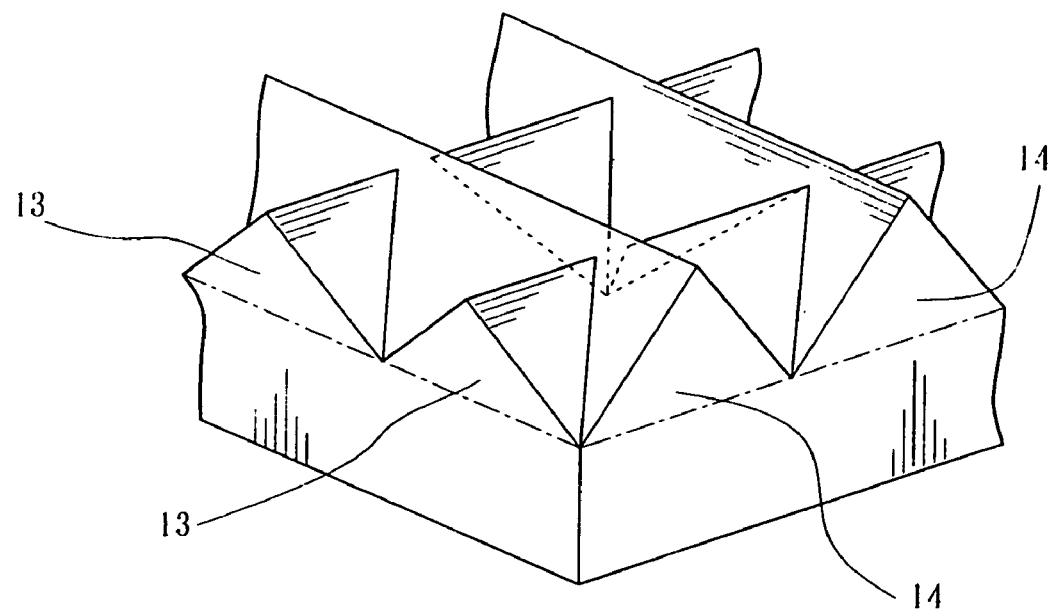
FIG. 6 is an enlarged view showing a portion of a prism sheet according to a second embodiment of the present invention.
Figure 7:
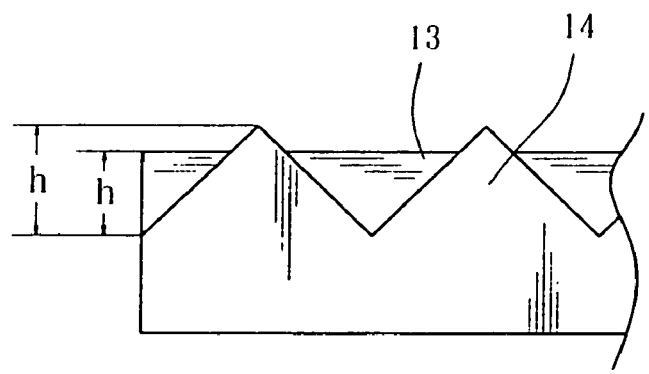
FIG. 7 is a side view showing the prism sheet of FIG. 6.
Figure 8:
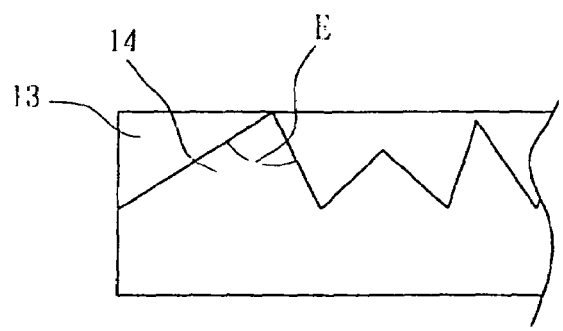
FIG. 8 is a side view showing a prism sheet according to a third embodiment of the present invention.

Since the horizontal and vertical viewing angle of a LCD display would vary in accordance with the apex angle, shape, and height of the prism lenses on the prism sheet, therefore, in a second embodiment of the present invention illustrated in FIGS. 6 and 7, the latitudinal and longitudinal prism lenses 13 and 14 could have independently configured, equal or different, heights h' and h so as to achieve the optimal horizontal and vertical viewing angles. Similarly, in a third embodiment of the present invention as illustrated in FIG. 8, the latitudinal and longitudinal prism lenses 13 and 14 could have independently configured, equal or different, apex angles E so as to achieve the optimal horizontal and vertical viewing angles.

Figure 9:
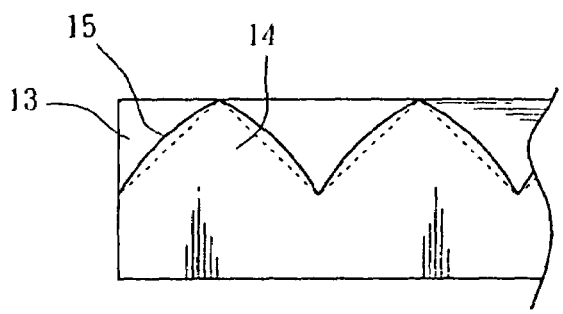
FIG. 9 is a side view showing a prism sheet according to a fourth embodiment of the present invention.

For the aforementioned embodiments, the two slant surfaces of a prism lens 13 or 14 could have other geometrical shapes. For example, as illustrated in FIG. 9, the prism lenses 13 and 14 have curved slant surfaces 15. In this way, the light receiving area and the refraction range of the prism lenses 13 and 14 could be further enlarged. Additionally, the orientations of the prism lenses 13 and 14 relative to the form factor of the prism sheet 10 could vary in accordance with the various requirements for viewing angles from different directions. In other words, a prism lens could have an orientation at an appropriate angle between the latitudinal and longitudinal directions.

Figure 10:
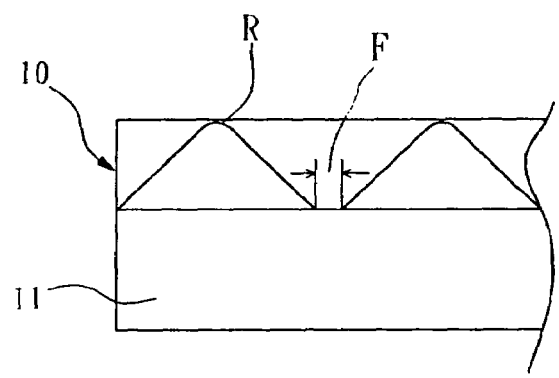
FIG. 10 is a side view showing a prism sheet according to a fifth embodiment of the present invention.
Figure 11:
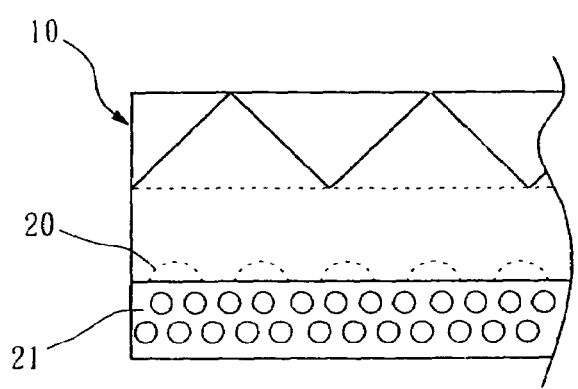
FIG. 11 is a side view showing a prism sheet configured with a diffusion mechanism at the bottom according to some embodiment of the present invention.

Further more, as shown in FIG. 10, the distances F between the bottom borders of two adjacent parallel prism lenses 13 or 14 could be identical to or different from each other. Also shown in FIG. 10, instead of having a sharp apex, the prism lenses 13 and 14 could have a curved apex R. Similarly, the prism lenses 13 and 14 could have a curved bottom border (not shown) at where a slant surface meets the base layer 11. Also shown in FIG. 10, the prism layer 12 and the base layer 11 could be made of either an identical material or different materials, and then bonded or compounded together into a single device. Please refer to FIG. 11. The bottom of a prism sheet 10 according to the present invention could be configured with a diffusion mechanism as illustrated. The diffusion mechanism could be concaves 20 or rough structured surface and could be formed directly with the prism sheet 10 by calendering. In an alternative embodiment, the diffusion mechanism is built by cladding a diffusion material 21 to the bottom of the prism sheet 10. Since these diffusion mechanisms are quite straightforward for those skilled in the related art and their description is omitted here for simplicity.

Figure 12:
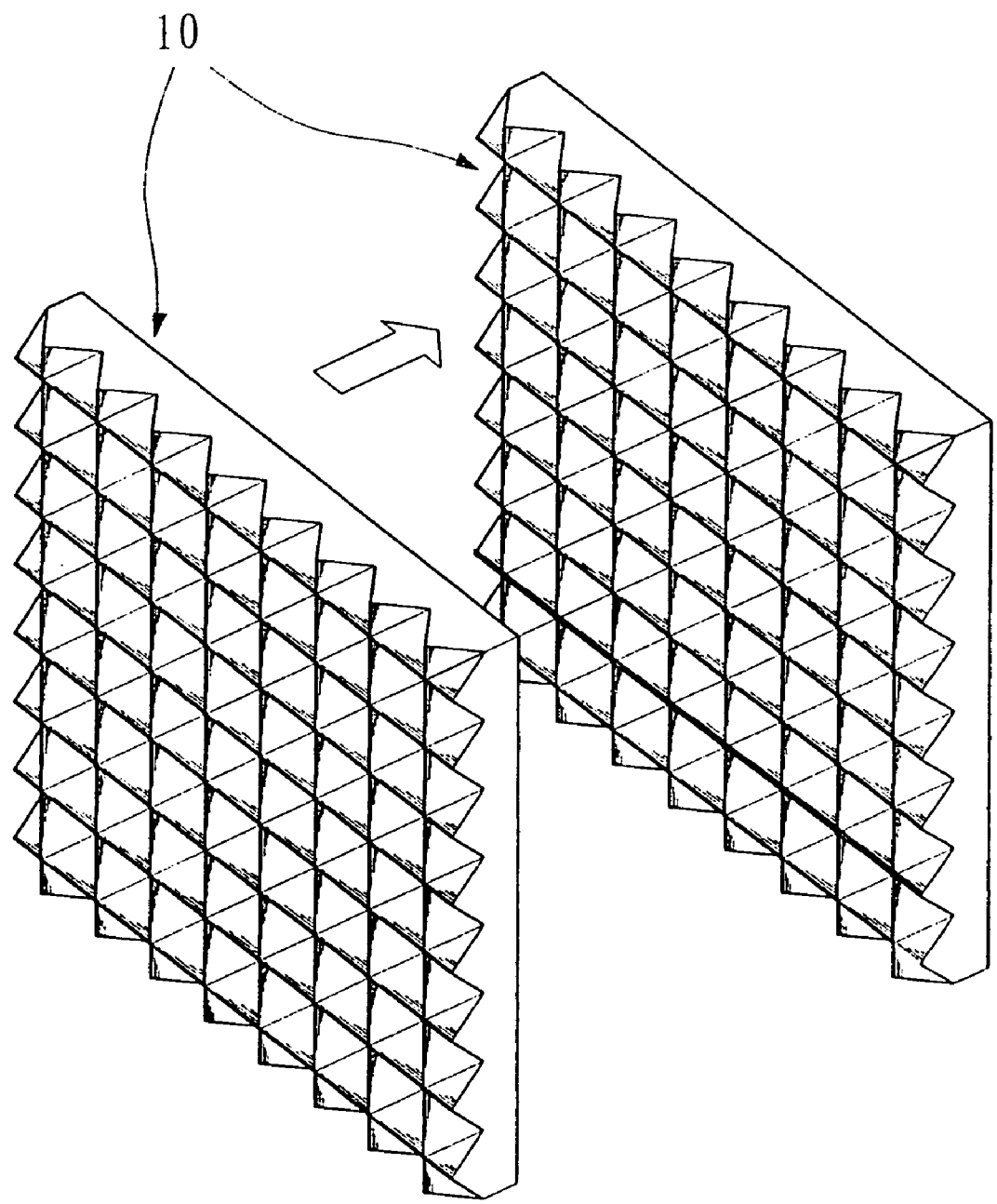
FIG. 12 is a perspective view showing an application scenario of using two overlapping prism sheets of the present invention.
Figure 13:
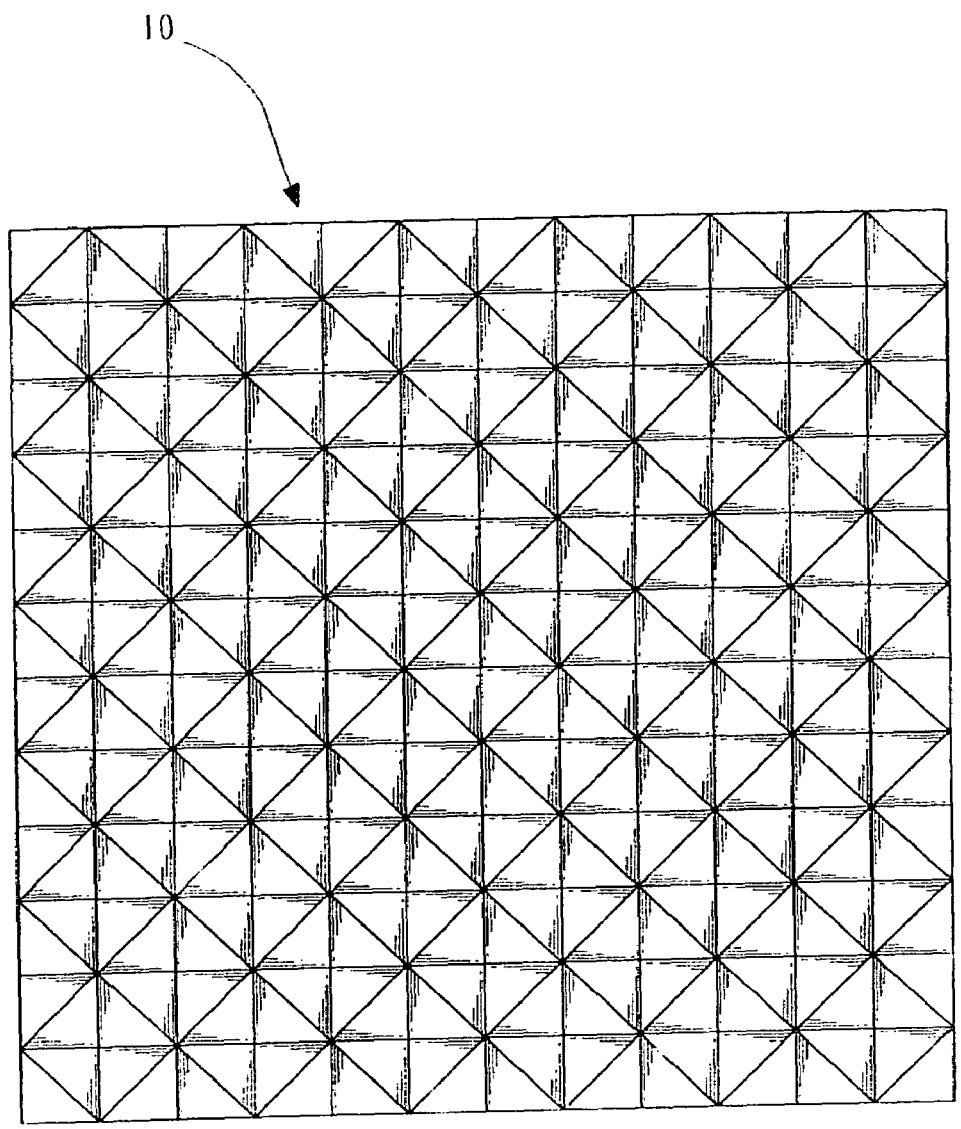
FIG. 13 is a top view of a prism sheet whose prism lenses orientation slants to the form factor of the prism sheet according to an embodiment of the present invention.

A single prism sheet 10 according to the aforementioned embodiments could be used in a backlight module to achieve both latitudinal and longitudinal convergence. In addition, by adjusting the apex angle, shape, and height of each prism lens, the prism sheet 10 of the present invention could achieve the optimal horizontal and vertical viewing angles. Besides the use of a single prism sheet 10, two or more prism sheets 10 of the present invention could be used together in a backlight module by positioning them in sequence between the light guide plate of the backlight module and the LCD's panel, as illustrated in FIG. 12.

Based on the foregoing description, the prism sheet according to the present invention indeed could achieve the proclaimed benefits. Not only it could be applied in the current LCD industry immediately, but also, most importantly, it could solve the problem that conventional prism sheets fail to satisfy most of the LCD displays' requirements on horizontal and vertical viewing angles.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A prism sheet of a backlight module for an LCD located between a light guide plate of said backlight module and a panel of said LCD, comprising:
    a base layer adapted to be above said light guide plate; and
    a prism layer formed on one side of said base layer, said prism layer being composed of a plurality of parallel longitudinal rows of first lenses and a plurality of parallel latitudinal rows of second lenses which are intersected wit each other at right angles, wherein each of said parallel longitudinal rows of said first lenses has a triangular cross section and a first ridge at a top thereof and there is no gap between bottoms of every two adjacent rows of said first lenses, each of said parallel longitudinal rows of said second lenses has a triangular cross section and a first ridge at a top thereof and there is no gap between bottoms of every two adjacent rows of said second lenses, thereby making said first ridge intersect said second ridge at a right angle and forming a plurality of rectangular recesses which are open at a top and have four slant triangular surfaces intersecting each other at a point.

2. The prism sheet as claimed in claim 1, wherein said triangular cross section has an upper end which is rounded in shape.

* * * * *